United States Patent [19]
Sakata et al.

[11] Patent Number: 4,666,756
[45] Date of Patent: May 19, 1987

[54] PRINTED TRANSFER PAPER FOR DECORATING POTTERY

[75] Inventors: Kazuhiko Sakata; Hideo Miyake, both of Otsu, Japan

[73] Assignee: Toyo Boseki Kabushiki Kaisha T/U Toyobo Co., Ltd., Osaka, Japan

[21] Appl. No.: 776,173

[22] PCT Filed: Dec. 22, 1984

[86] PCT No.: PCT/JP84/00611

§ 371 Date: Sep. 5, 1985

§ 102(e) Date: Sep. 5, 1985

[87] PCT Pub. No.: WO85/03040

PCT Pub. Date: Jul. 18, 1985

[30] Foreign Application Priority Data

Jan. 5, 1984 [JP] Japan .................................... 59-390
May 24, 1984 [JP] Japan .............................. 59-105758

[51] Int. Cl.[4] ........................ B32B 3/00; C08F 8/00; B41M 3/12

[52] U.S. Cl. .................................. 428/202; 428/211; 427/53.1; 427/149; 522/121

[58] Field of Search .................. 204/159.16; 427/149, 427/53.1, 54.1; 428/202, 211

[56] References Cited

U.S. PATENT DOCUMENTS 4,113,487 9/1978 Matsunaga et al. ................ 96/38.1
4,379,039 4/1983 Fujimoto et al. ............. 204/159.15

FOREIGN PATENT DOCUMENTS 50278 6/1978 Japan .
3061423 6/1978 Japan .
57-82082 5/1982 Japan .
7152993 9/1982 Japan .
7142385 9/1982 Japan .
58-84791 5/1983 Japan .
58-84792 5/1983 Japan .
58-84793 5/1983 Japan .
59-41291 3/1984 Japan .
59-89309 5/1984 Japan .
1258241 12/1971 United Kingdom .
8202894 9/1982 United Kingdom .

*Primary Examiner*—John E. Kittle
*Assistant Examiner*—Patrick J. Ryan

[57] ABSTRACT

A printed transfer paper for decorating a pottery having a base paper, a decorating ink layer and a cover coat layer characterized in that a binder of a decorating ink layer and/or a cover coat agent of a cover coat layer comprise:

(I) a polymer or/and copolymer of a compound having a general formula (A):

(II) a photopolymerizáble compound having a general formula (B):

(III) a photopolymerizable compound having a polymerizable double bond(s) in the molecular other than the compound having the general formula (B), and (IV) a photoinitiator.

5 Claims, 1 Drawing Figure

PRINTED TRANSFER PAPER FOR DECORATING POTTERY

FIELD OF THE INVENTION

The present invention relates to a printed transfer paper for decorating pottery which is used in decorating of pottery, more particularly, to a printed transfer paper for decorating pottery which employs a novel binder for a decorating ink layer (hereinafter, referred to squeegee oil) and/or a novel cover coat agent.

BACKGROUND OF THE INVENTION

As one method for decorating pottery, it is known to use a transfer paper which is printed with a decorating ink layer containing a color pigment for pottery on a base paper, which is coated by a size such as dextrin solution and dried, and on which a cover coat layer is printed. This method is the so called "slide" transfer method by water, and comprises separating an integrated cover coat layer and decorating ink layer from a base paper in water, bringing the decorating ink layer into contact with pottery to mount it on the surface thereof and drying, and then, baking the cover coat layer, ink and binder at a high temperature to effect decorating.

A squeegee oil or a cover coat agent of a printed transfer paper for decorating pottery now employed is mainly a solvent type polymethacrylate ester type resin, which has many problems that to be solved and provides a severe problem in ceramic industry.

That is, such printed transfer paper has following many defects:

(1) A solvent type squeegee oil or a solvent type cover coat resin generally contains a solvent having a high boiling point such as toluene, xylene, dimethybenzene, ethylbenzene, triethylbenzene, trimethylbenzene ethylene glycol monobutyl ether, ethylene glycol monoethyl acetate, to prevent clogging in a screen printing plate, and hence, it produces a low drying velocity and a less improved productivity rate.

(2) It produces substantial environmental pollution in the workroom as well as air pollution as a result of the solvent used in the solvent type resin. This defect should be solved quickly because of safety and sanitary conditions and working and environmental disruption.

(3) It takes a very long time for printing using a conventional solvent type squeegee oil, particularly, in multicolor printing because of the low drying velocity of the oil.

(4) Clogging of a screen plate often results because of using of a solvent type resin and, therefore, it is difficult to obtain a fine design.

(5) A conventional solvent type resin for a cover coat readily produces a blocking of printed transfer paper by residual solvent because of its low drying velocity.

(6) Therefore, each conventional printed transfer paper for decorating pottery has to be sandwiched by paraffin papers or the like to prevent blocking.

(7) A conventional printed transfer paper for decorating pottery which employs a solvent type resin for a cover coat is liable to change with time and it loses flexibility resulting in loss of mounting ability during storage.

It is well known that, as resins for eliminating these defects of a solvent type resin, so called non-solvent type resins, ultraviolet curable resins have been considered, and various proposals have been made. Therefore, an attempt to apply an ultraviolet curable resin to decorating pottery has been considered and is known.

For example, Japanese Patent Laid Open Publication No. 115390/1982 proposes application of an ultraviolet curable resin to a squeegee oil and a cover coat agent of printed transfer paper for decorating pottery, but such an attempt has not yet been put into in practice. The main reason for this is that the resin has defects in its properties such as (1) no flexibility and less ability to be mounted, (2) high decomposition temperature and unfavorable color developing after baking.

The present inventors have proposed application of an ultraviolet curable resin to a squeegee oil (Japanese Patent Laid Open Publication No. 152993/1982) and also have proposed an application of ultraviolet curable resin to a cover coat layer (Japanese Patent Laid Open Publication No. 142385/1982), and thereafter have intensively studied these possibilities. As a result, it has been found that, although these resins have no defect, particularly, in mounting ability for a slide transfer onto a flat surface such as flat ware and tile, they have insufficient ability for slide transfer onto pottery having a considerably curved surface such as a green tea cup, a coffee cup, a bowl of pottery, a deep dish, a flower vase and a rice bowl, and readily produce a cleavage of a decorating ink layer.

DISCLOSURE OF THE INVENTION

Then, the present inventors further intensively studied to solve such defects. As a result, it has been found that when diacrylate and/or dimethacrylate of polyoxyalkylene glycol are used in the resin, there is obtained a squeegee oil having an excellent slide transfer ability and color developing ability, and a resin for a cover coat having an excellent slide transfer ability, and hence, the present invention has been attained.

The present invention provides a printed transfer paper for decorating pottery having a base paper, a decorating ink layer and a cover coat layer characterized in that a binder of a decorating ink layer (squeegee oil) and/or a cover coat agent of a cover coat layer comprises:

(I) a polymer and/or copolymer of a compound having a general formula (A):

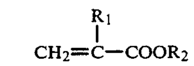

(A)

(wherein, $R_1$ is hydrogen or methyl; $R_2$ is hydrogen, or alkyl, cycloalkyl, aralkyl or aryl having 1 to 20 carbon atoms), (II) a photopolymerizable compound having a general formula (B):

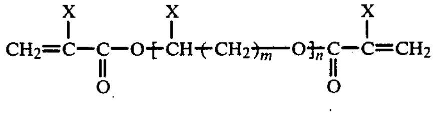

(B)

(wherein, X is hydrogen or methyl, m is a positive integer of 1 to 3, n represents mole of addition, $4 \leq n \leq 100$), (III) a photopolymerizable compound having a polymerizable double bond(s) in the molecule other than the compound having the general formula (B), and (IV) a photoinitiator.

The squeegee oil and/or cover coat agent used in the present invention is an ultraviolet curable resin consisting essentially of (I) of polymer and/or copolymer of compound having the above described general formula (A), (II) a photopolymerizable compound having the general formula (B), (III) a photopolymerizable compound having a polymerizable double bond(s) in the molecular other than the compound having the general formula (B), and (IV) a photoinitiator.

Examples of the polymer and/or copolymer of a compound having the general formula (A) used in the present invention are a polymer and/or copolymer of alkyl (meth)acrylate esters such as methyl (meth)acrylate (the term "(meth)acrylate" means both methyl acrylate ester and methyl methacrylate ester, hereinafter, expressed similarly), ethyl (meth)acrylate, n-propyl (meth)acrylate, iso-propyl (meth)acrylate, n-butyl (meth)acrylate, iso-butyl (meth)acrylate, tert-butyl (meth)acrylate; cycloalkyl (meth)acrylate esters such as cyclohexyl (meth)acrylate; aralkyl (meth)acrylate esters such as benzyl (meth)acrylate; aryl (meth)acrylate esters such as phenyl (meth)acrylate; and the like.

There may be also used a copolymer of such (meth)acrylate esters with ethylene, stylene, butadiene, isobutylene, isoprene, vinyl acetate, isobutyl vinyl ether, n-propyl vinyl ether, acrylonitrile, and the like.

Preferred compounds having the general formula (A) are compounds having 1 to 4 carbon atoms, and a copolymer of methyl methacrylate and n-butyl methacrylate is particularly preferred. Methyl methacrylate and n-butyl methacrylate are copolymerized in the molar ratio of methyl methacrylate:n-butyl methacrylate = 10:90 to 90:10, preferably 20:80 to 80:20. When the molar ratio of the compounds polymerized is outside the above range, the decorating ink layer and/or cover coat layer have insufficient flexibility and also have insufficient printability.

The compound (I) is incorporated into the binder of the decorating ink layer in an amount of 5 to 60% by weight, preferably 10 to 50% by weight, based on the whole weight of the resin composition. When the amount is less than 5% by weight, sufficient flexibility and curing property cannot be obtained on the other hand, when the amount is over 60% by weight, it produces a resin composition having so high a viscosity as to impair processability.

The compound (I) is incorporated into the cover coat agent in an amount of 10 to 60% by weight, preferably 20 to 50% by weight, based on the whole weight of the resin composition. When the amount is less than 10% by weight, there can not be obtained sufficient flexibility, curing property and mounting property cannot be obtained on the other hand, when the amount is over 60% by weight, it produces a resin composition having so high a viscosity as to impair processability.

The photopolymerizable compound (II) having the general formula (B) used in the present invention includes the following compounds:

Examples of the compound of the formula (B), wherein $m=1$ and $n=4$, are polyethylene glycol (adduct of 4 moles ethylene oxide) di(meth)acrylate, polypropylene glycol (adduct of 4 moles propylene oxide) di(meth)acrylate, and the like.

Examples of the compound of the formula (B), wherein $m=1$ and $n=9$, are polyethylene glycol (adduct of 9 moles ethylene oxide) di(meth)acrylate, polypropylene glycol (adduct of 9 moles propylene oxide) di(meth)acrylate, and the like.

Examples of the compound of the formula (B), wherein $m=1$ and $n=14$, are polyethylene glycol (adduct of 14 moles ethylene oxide) di(meth)acrylate, polypropylene glycol (adduct of 14 moles propylene oxide) di(meth)acrylate, and the like.

Examples of the compound of the formula (B), wherein $m=1$ and $n=23$, are polyethylene glycol (adduct of 23 moles ethylene oxide) di(meth)acrylate, polypropylene glycol (adduct of 23 moles propylene oxide) di(meth)acrylate, and the like.

Similarly, examples of the compound of the formula (B), wherein $m=2$, are polytrimethylene glycol (adduct of n moles trimethylene oxide) di(meth)acrylate and the like.

Examples of the compound of the formula (B), wherein $m=3$, are polytetramethylene glycol (adduct of n moles tetramethylene oxide) di(meth)acrylate and the like.

Particularly preferred photopolymerizable compound having the general formula (B) is polypropylene glycol (adduct of n moles propylene oxide) di(meth)acrylate ($4 \leq n \leq 100$).

It is required for the photopolymerizable compound (II) having the general formula (B) that the addition molar number n is in the range of $4 \leq n \leq 100$. When n is less than 4, it produces less flexibility in the decorating ink layer, or less flexibility and less mounting property in the cover coat layer, and hence, it produces insufficient slide transfer ability for potteries having much curved surface, such as a green tea cup, a coffee cup, a bowl of pottery, a deep dish, a flower vase, a rice bowl, and the like. On the other hand, when n is over 100, it induces an excessive flexibility in the decorating ink layer and/or the cover coat layer, and hence, it also induces insufficient slide transfer ability and mounting property. It is preferred that n is 4 to 30.

The photopolymerizable compound (II) having the general formula (B) preferably comprises polyethylene glycol di(meth)acrylate and polypropylene glycol di(meth)acrylate in a weight ratio of 0 to 90/100 to 10, preferably 10 to 80/90 to 20.

The compound (II) having the general formula (B) is incorporated in an amount of 5 to 80% by weight, preferably 10 to 70% by weight, based on the whole weight of the resin composition. When the compound (II) having the general formula (B) is incorporated in an amount of less than 5% by weight, it induces insufficient flexibility, on the other hand; when the amount is over 80% by weight, it induces a resin composition having so high a viscosity as to impair processability.

Examples of the photopolymerizable compound (III) having one polymerizable double bond in the molecule, within the photopolymerizable compounds used in the present invention other than the compound having the general formula (B), are (i) styrene compounds, such as styrene, α-methylstyrene, chlorostyrene; (ii) alkyl (meth)acrylates such as methyl (meth)acrylate, ethyl (meth)acrylate, n- and i-propyl (meth)acrylate, lauryl (meth)acrylate, stearyl (meth)acrylate; hydroxyalkyl (meth)acrylate such as 2-hydroxyethyl acrylate; polyoxyalkylene glycol mono(meth)acrylate such as polyethylene glycol mono(meth)acrylate, polypropylene glycol mono(meth)acrylate; substituted alkyl mono(-meth)acrylate such as alkoxypolyoxyalkylene mono(-meth)acrylate; heterocyclic ring-containing (meth)acrylate such as tetrahydrofurfuryl (meth)acrylate.

Examples of the photopolymerizable compound (III) having two photopolymerizable double bonds in the molecular are (i) alkylene glycol di(meth)acrylate, such as ethylene glycol di(meth)acrylate, propylene glycol di(meth)acrylate, 1,4-butanediol di(meth)acrylate, neopentyl glycol di(meth)acrylate, 1,6-hexanediol di(meth-)acrylate; diethylene glycol di(meth)acrylate, triethylene glycol di(meth)acrylate, dipropylene glycol di(-meth)acrylate.

Examples of the photopolymerizable compound (III) having three or more photopolymerizable double bonds in the molecule are (i) poly(meth)acrylate of tri- or more polyvalent aliphatic alcohol, such as trimethylolpropane tri(meth)acrylate, trimethylolethane tri(meth-)acrylate, pentaerythritol tetra(meth)acrylate; poly(-meth)acrylate of tri- or more polyvalent halogen-substituted aliphatic alcohol.

When the photopolymerizable compound having three or more polymerizable double bonds in the molecule is used in a large amount, it induces decreased flexibility in a squeegee oil and does not effect good color development on baking, and hence, the compound should be used in limited small amount.

The photopolymerizable compound (III) other than the compound having the general formula (B) is incorporated 30 to 90% by weight, preferably 40 to 80% by weight, based on the whole weight of the resin composition. When the compound (III) is incorporated into the whole resin composition in an amount of less than 30% by weight, there is obtained a resin having so high a viscosity as to impair processability. On the other hand, when the amount is over 90% by weight, it induces insufficient flexibility and curing property or the like in the squeegee oil, and induces insufficient flexibility, mounting property and curing property or the like in the cover coat layer.

The photoinitiator used in the present invention is a compound which promotes the photopolymerization reaction of the photopolymerizable compound, and includes, for example, ketals such as benzyl dimethyl ketal; benzoins such as benzoin methyl ether, benzoin ethyl ether, anthraquinones such as 1-chloroanthraquinone, 2-ethylanthraquinone; benzophenones such as benzophenone, p-dimethylaminobenzophenone; propiophenones such as 2-hydroxy-2-methylpropiophenone; suberones such as dibenzosuberone; sulfur-containing compounds such as diphenyl disulfide, tetramethylthiuram disulfide, thioxanthon; or the like, which may be used alone or in combination of two or more kinds thereof.

The photoinitiator (IV) is preferably incorporated in an amount of 0.05 to 20% by weight, more preferably 0.5 to 10% by weight, based on the whole weight of the polymer and/or copolymer (I) of a compound having the above general formula (A) and the photopolymerizable compounds (II) and (III).

In order to promote the accelerating effect on photopolymerization reaction of the photoinitiator (IV), there may be incorporated a photosensitizer in a combined use, e.g. amines such as triethanolamine, triethylamine, N,N-diethylaminoethyl (meth)acrylate; phosphorous compounds such as triphenylphosphine.

The ultraviolet curable resin of the present invention can be used in a form that a resin, which comprises a conventional solvent type resin such as methyl methacrylate ester/n-butyl methacrylate ester copolymer and a solvent such as xylene, toluene, trimethylbenzene, dimethylbenzene, is used as a cover coat layer on the decorating ink layer in the present invention, however, when the cover coat layer is the ultraviolet curable type resin, the above defects of the solvent type resin are resolved.

The ultraviolet curable resin of the present invention can be used in a decorating ink layer having a resin as a binder, which comprises a conventional solvent type resin such as methyl methacrylate ester/n-butyl methacrylate ester copolymer and a solvent such as xylene, toluene, trimethylbenzene, dimethylbenzene, however, when the binder is the ultraviolet curable type resin, the above defects of the solvent type resin are resolved.

The ultraviolet curable type resin used for squeegee oil and/or a cover coat layer may be incorporated with a conventional thermal polymerization inhibitor, an anti-oxidant, a leveling agent, a defoaming agent, a thickening agent, a thixotropic agent, a pigment, or the like to control the viscosity, storage stability and printing ability for use.

The base paper used in the transfer paper for decorating pottery may be simple paper, collodion-coated pper, separate paper, thermaflat paper, or the like.

The decorating ink layer is printed onto the transfer paper; the cover coat agent is printed onto the above decorating ink layer; the ultraviolet is irradiated to cure them. The light sources used in the irradiation of ultraviolet are sun light, chemical lamp, low pressure mercury-vapor lamp, high pressure mercury-vapor lamp, carbon arc lamp, xenone lamp, metal halide lamp, or the like.

Utility in Industry

The present invention provides the following advantages in the properties by using of a novel ultraviolet curable resin type for the squeegee oil.

(i) It produces an excellent slide transfer ability onto pottery having a curved surface because of flexibility of a decorating ink layer.

(ii) Because the decorating ink layer is of the ultraviolet curable type, it produces less clogging of the screen printing plate to give a fine and clear design.

(iii) It maintains an excellent mounting ability because of no change of decorating ink layer with time.

(iv) Because the decorating ink layer has no change with time, it can maintain an excellent mounting ability.

(v) The baking can provide a superior decoration in color development because of its excellent baking ability.

The present invention provides the following advantages in the properties by using of a novel ultraviolet curable type resin for the cover coat.

(i) It produces an excellent slide transfer ability onto pottery having a curved surface because of flexibility of the cover coat layer.

(ii) Because the cover coat layer is the ultraviolet curable type resin and has substantially no solvent, it does not induce the blocking by a residual solvent.

(iii) Therefore, it is not necessary to spend a labor hour for prevention of the blocking such as by inserting paraffin papers, or the like.

(iv) It maintains an excellent mounting ability because of no change of the cover coat layer with time.

The ultraviolet curable resin of the present invention has essential properties which ae required for a squeegee oil or a cover coat layer for decorating pottery, such as baking property, mounting ability or the like, and hence, it produces a widely extending effect such as decrease of environmental pollution in the workroom, high productivity, labor-saving or the like.

DESCRIPTION OF THE PREFERRED EMBODIMENT

Figure 1:
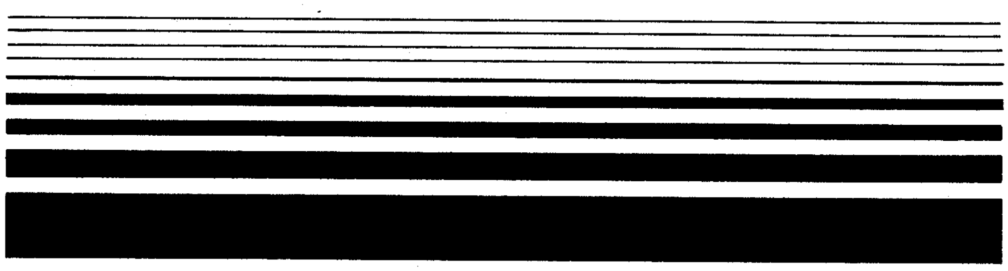

The present invention is illustrated by the following Examples, but is not limited thereto.

In the Examples, the term "parts" and "%" respectively mean "parts by weight" and "wt%". The properties of the printed transfer paper for decorating a pottery were measured in the following manner:

Printing ability of the squeegee oil

The base paper coated with dextrin solution was printed with a decorating ink which consists of a pigment and a squeegee oil, by using of 250 mesh polyester screen plate having the pattern shown in FIG. 1, and their printing ability was evaluated by the number of sheets of printed paper without any clogging in the screen plate and deficiency of fine lines.

Printing ability of the cover coat agent

On the decorating ink layer formed on the paper coated with dextrin solution (see FIG. 1), a cover coat agent was printed in the size of 18 cm×4.5 cm×20 μm, by using of 100 mesh polyester screen plate. And the printing ability was evaluated by the number of sheets of printed paper without any clogging in polyester screen plates.

Mounting ability of the decorating ink layer

The printed transfer paper for decorating pottery which consists of base paper, decorating ink layer and cover coat layer was soaked in water at 25°-30° C. for 60 seconds, and then transferring was carried out onto a white solid coffee cup and a green tea cup using a rubber spatula, and the mounting ability of the decorating ink layer in the transfer step was evaluated as follows:

o: showing a good transfer property, Δ: producing cleavages on a decorating ink layer at the transfer step, x: being difficult to slide from the printed transfer paper to a pottery item

Mounting ability of the cover layer

The printed transfer paper for decorating pottery which consists of base paper, decorating ink layer and cover coat layer was soaked in water at 25°-30° C. for 60 seconds, and then transferring was carried out onto a white solid coffee cup and a green tea cup by using a rubber spatula, and the mounting ability of the cover coat was evaluated.

o: showing a good transfer property, Δ: producing cleavages on the decorating ink layer at the transfer step, x: being difficult to slide from the printed transfer paper to a pottery item

Blocking property

The test was performed on 100 sheets of the printed transfer paper for decorating pottery, which is piled with the printed surface thereof being faced to the back of the other transfer paper, under the following conditions, and the blocking property was evaluated. It is demonstrated by the number of sheets which showed blocking out of 100 sheets of the printed transfer paper examined.

The condition for the blocking test:

Load: 17 g/cm$^2$, Temperature: 25° C., Humidity: 60% RH, Time for shelf test: 24 hours

Baking and color developing properties

The coffee cup and a green tea cup, on which the printing layer was transferred, were baked at the rate of 300° C./hr up to 800° C. The baking and color developing ability were evaluated according to the extent of generating pinholes, blurs or blots on the pattern after baking.

Preparation 1

Twenty five parts of methyl methacrylate (MMA)-n-butyl methacrylate (n-BMA) copolymer (MMA/n-BMA=40/60 by weight, average molecular weight: 75,000), 55 parts of tetrahydrofurfuryl methacrylate, 5 parts of laurylmethacrylate, 10 parts of polyethylene glycol (adduct of 14 moles of ethylene oxide) dimethacrylate, 5 parts of polypropylene glycole (adduct of 14 moles of propylene oxide) dimethacrylate, 2 parts of leveling agent, 6 parts of benzyl dimethyl ketal as a photoinitiator, 2 parts of 2-ethyl anthraquinone was mixed to effect dissolution at room temperature and give an ultraviolet curable type resin for squeegee oil (A).

In the same manner, the ultraviolet curable resins for squeegee oil (B)-(D), the polymers and the photo polymerizable compounds which are shown in Table 1, were prepared. In this case, the compounds used as a photoinitiator and leveling agent for the resin (A) were used in the same amount as described above.

TABLE 1

| | | Resin for Squeegee Oil | | | |
|---|---|---|---|---|---|
| | Compound | A | B | C | D |
| (I) | MMA/n-BMA Copolymer (*1) | | | | |
| | Polymerizing Ratio | 40/60 | 40/60 | 40/60 | 20/80 |
| | Average Molecular Weight | 75,000 | 75,000 | 75,000 | 35,000 |
| | Amount (parts) | 25 | 25 | 25 | 25 |
| (III) | THF—MA (*2) Amount (parts) | 55 | 60 | 60 | 58 |
| (III) | LMA (*3) Amount (parts) | 5 | — | — | — |
| (II) | PEG—EO—DMA (*4) | | | | |
| | Added EO (moles) | 14 | — | — | 23 |
| | Amount (parts) | 10 | — | — | 7 |
| (II) | PPG—PO—DMA (*5) | | | | |
| | Added PO (moles) | 23 | 23 | — | 23 |
| | Amount (parts) | 5 | 15 | — | 7 |
| (II) | PTG—TO—DMA (*6) | | | | |
| | Added TO (moles) | — | — | 23 | — |
| | Amount (parts) | — | — | 15 | — |

(*1) Methyl methacrylate - n-butyl methacrylate copolymer
(*2) Tetra hydrofurfuryl methacrylate
(*3) Lauryl methacrylate
(*4) Polyethylene glycol (adduct of ethylene oxide (EO)) dimethacrylate
(*5) Polypropylene glycol (adduct of propylene oxide (PO)) dimethacrylate
(*6) Polytetramethylene glycol (adduct of tetramethylene oxide (TO)) dimethacrylate

Reference Preparation 1

Twenty five parts of methyl methacrylate (MMA)-n-butyl methacrylate (n-BMA) copolymer (MMA/n-BMA=40/60 by weight, average molecular weight:

75,000), 60 parts by tetrahydrofurfuryl methacrylate, 15 parts of 1,6-hexanediol methacrylate, 2 parts of leveling agent, 6 parts of benzyl dimethyl ketal as a photoinitiator, and 2 parts of 2-ethyl anthraquinone were mixed to effect dissolution at room temperature and give an ultraviolet curable type resin for squeegee oil (E).

In the same manner, the ultraviolet curing type resins for squeegee oil (F)-(G), the polymer and the photo polymerizable compounds of which were shown in Table 2, were prepared. In this case, the compounds used as a photoinitiator and leveling agent for the resin (E) was used in the same amount as described above.

TABLE 2

| | | Resin for Squeegee Oil | | | |
|---|---|---|---|---|---|
| | Compound | E | F | G | H |
| (I) | MMA/n-BMA Copolymer | | | | |
| | Polymerizing Ratio | 40/60 | | 40/60 | 40/60 |
| | Average Molecular Weight | 75,000 | | 75,000 | 75,000 |
| | Amount (parts) | 25 | — | 30 | 25 |
| (I) | n-BMA Copolymer (*7) | | | | |
| | Average Molecular Weight | | 220,000 | | |
| | Amount (parts) | — | 10 | — | — |
| (III) | THF—MA Amount (parts) | 60 | 60 | 35 | — |
| (III) | 1,6-HD—DMA (*8) Amount (parts) | 15 | — | — | — |
| (III) | EG—DMA (*9) Amount (parts) | — | 20 | — | — |
| (III) | TMP—TMA (*10) Amount (parts) | — | 10 | — | — |
| (II) | PEG—EO—DMA | | | | |
| | Added EO (moles) | | | 3 | |
| | Amount (parts) | — | — | 20 | — |
| (II) | PPG—PO—DMA | | | | |
| | Added PO (moles) | | | 2 | |
| | Amount (parts) | — | — | 15 | — |
| | Solvent (*11) Amount (parts) | — | — | — | 75 |

(*7) n-Butyl methacrylate polymer
(*8) 1,6-Hexanediol dimethacrylate
(*9) Ethylene glycol dimethacrylate
(*10) Trimethylol (*11) trimethacrylate
(11) Solvetz #100 (produced by ESSO Standard Oil Co. Ltd.)

EXAMPLE 1

The pattern shown in FIG. 1 (17 cm long, 4 cm wide, about 10 μm thick) was printed on a single sheet of paper coated with dextrin solution, with the ultraviolet curable type ink for decorating pottery, which consists of 60% of selenium red and 40% of the ultraviolet curable type resin composition (A) for squeegee oil, by use of a 250 mesh polyester screen plate. In this case, the screen was not clogged and there were no deficiency of fine lines after printing of more than 1,000 sheets.

This printed transfer paper was irradiated with a water-cooled high pressure mercury lamp (5.6 KW) at 15 cm distance for 14 seconds to cure and form a decorating ink layer. Then commercially available solvent-type resin for cover coat (I) (Mitsubishi LR758F1, produced by Mitsubishi Rayon KK) was printed on the decorating ink layer in the size of 18 cm long, 4.5 cm wide, 20 μm wide, by use of a 100 mesh polyester screen plate. The cover coat layer printed was stood and dried in the drier of 40° C., 50% RH for 1 hour.

The resulting printed transfer paper was transferred on a coffee cup and a green tea cup of solid white, and the mounting ability was evaluated. Then the above coffee cup and green tea cup were baked at the rate of 300° C./hour, up to 800° C., and the extent of baking and color developing properties were evaluated.

EXAMPLES 2 TO 5

A printed transfer paper for decorating a pottery was prepared in the same manner as described in Example 1, except that the ultraviolet curable type ink for decorating pottery contains the pigment shown in Table 2 instead of selenium red, and ultraviolet curable type resins for squeegee oils (B)-(D) were used instead of (A).

The printed and mounting abilities, and baking and color developing properties of the printed transfer paper are shown in the Table 3.

TABLE 3

| Example | 1 | 2 | 3 | 4 |
|---|---|---|---|---|
| Decorating ink pigment | Selenium red | Azure blue | Vanadium tin yellow | Zircon gray |
| Ultraviolet curable type resin for squeegee oil | A | B | C | D |
| Printing ability (number of sheets printed) | >1,000 | >1,000 | >1,000 | >1,000 |
| Mounting ability | o | o | o | o |
| Baking and color Developing ability | Good | Good | Good | Good |

Reference Example 1

In the same manner as described in Example 1, the pattern of FIG. 1 (17 cm long, 4 cm wide, about 10 μm thick) was printed on a single sheet coated with dextrin of the Example 1, with 60 wt% of pigment of selenium red and ultraviolet curable type resin of squeegee oil (E) of the Reference preparation, and cured.

Then, the commercially available solvent-type resin for cover coat (I) (described above) was printed on the decorating ink layer in the size of 18 cm long, 4.5 cm wide, 20 μm thick, by using of 100 mesh polyester screen plate.

The resulting transfer paper was evaluated in the same manner as Example 1. The results are shown in Table 4.

Reference examples 2 and 3

A printed transfer paper for decorating pottery was prepared in the same manner as Example 1, except that the ultraviolet curable type decorating ink for decorating pottery contains the pigment shown in Table 4, and the ultraviolet curable type resin (F) or (G) was used instead of (A).

The printing and mounting abilities, and baking and color developing properties of the transfer paper are shown in the Table 4.

Reference example 4

In the same manner as described in Example 1, the pattern was printed on a single sheet of paper coated with dextrin of Example 1, using 60 wt% of the pigment selenium red and the solvent-type resin (H) for the squeeze oil. In the case where the solvent-type resin was used for the squeeze oil, the screen was clogged after more than 20 sheets of paper were printed. The pattern layer was placed in a drier at 40° C., 50% RH for 1 hour to be dried. The printed transfer paper for decorating a pottery was prepared by using solvent-type resin for cover coat (I) in the same manner as Example 1. The printing and mounting abilities, and the baking and color developing properties of the printed transfer paper are shown in Table 4.

TABLE 4

| Example | 1 | 2 | 3 | 4 |
|---|---|---|---|---|
| Pigment | Selenium red | Azure blue | Vanadium tin yellow | Zircon gray |
| Ultraviolet curable type resin for squeegee oil | E | F | G | H |
| Printing ability (number of sheets) | >1,000 | >1,000 | >1,000 | 20 |
| Mounting ability | Δ | x | x | x |
| Baking and color developing properties | Good | A few pin-holes and wavy lines | Good | Good |

Preparation 2

Thirty parts of methyl methacrylate/n-butyl methacrylate copolymer having a molecular weight of 75,000 (MMA/n-BMA=40/60 by weight), 56.4 parts of tetrahydrofurfuryl methacrylate, 7 parts of polyethylene glycol (adduct of 14 moles ethylene oxide) dimethacrylate, 6.6 parts of polypropylene glycol (adduct of 9 mole propylene oxide) dimethacrylate, 2 parts of leveling agent, 6 parts of benzyl dimethylketal as a photoinitiator and 2 parts of 2-ethyl anthraquinone were mixed to effect dissolution at room temperature to give an ultraviolet curable type resin for cover coat (A').

The ultraviolet curable type resins for cover coat (B')-(E'), wherein the polymers and the photopolymerizable compounds are those shown in Table 1, were prepared in the same manner as described above. The photoinitiator and the leveling agent used and the amount thereof were the same as those used for (A').

TABLE 5

| | Compound | Resin for Cover Coat A' | B' | C' | D' | E' |
|---|---|---|---|---|---|---|
| (I) | MMA/n-BMA copolymer (*1) | | | | | |
| | Polymerizing ratio | 40/60 | 40/60 | 40/60 | 40/60 | 20/80 |
| | Molecular weight | 75,000 | 75,000 | 75,000 | 75,000 | 35,000 |
| | Amount (parts) | 30 | 30 | 30 | 30 | 30 |
| (III) | THFMA (*2) Amount (parts) | 56.4 | 60 | 45 | 55 | 56 |
| (II) | PEG—EO—DMA (*3) | | | | | |
| | Added EO (moles) | 14 | 14 | 14 | 14 | 23 |
| | Amount (parts) | 7 | 7 | 10 | 5 | 7 |
| (II) | PEG—PO—DMA (*4) | | | | | |
| | Added PO (moles) | 9 | 23 | 23 | — | 23 |
| | Amount (parts) | 6.6 | 3 | 15 | — | 7 |
| (II) | PEG—TO—DMA (*5) | | | | | |
| | TO added (moles) | — | — | — | 23 | — |
| | Amount (parts) | — | — | — | 10 | — |

(*1) Methyl methacrylate - n-butyl methacrylate copolymer
(*2) Tetrahydrofurfuryl methacrylate
(*3) Polyethylene glycol (adduct of ethylene oxide)-dimethacrylate
(*4) Polypropyleneglycol (adduct of propylene oxide)-dimethacrylate
(*5) Polytetramethylene glycol (adduct of tetramethylene oxide) dimethacrylate

Reference preparation 2

Thirty parts of methyl methacrylate/n-butyl methacrylate copolymer having a molecular weight of 75,000 (MMA/n-BMA=40/60 by weight), 55 parts of tetrahydrofurfuryl methacrylate, 15 parts of 1,6-hexanediol dimethacrylate, 2 parts of leveling agent, 6 parts of benzyl dimethyl ketal as a photoinitiator and 2 parts of 2-ethyl anthraquinone were mixed and dissolved at room temperature to give an ultraviolet curable type resin for cover coat (F').

The ultraviolet curable type resins for cover coat (G')-(I'), wherein the polymers and the photo polymerizable compounds are those shown in Table 2, were prepared in the same manner as described above. The photoinitiator and the leveling agent used and the amount thereof were the same as those used for (F').

TABLE 6

| | Compound | Resin for Cover Coat F' | G' | H' | I' |
|---|---|---|---|---|---|
| (I) | MMA/n-BMA Copolymer | | | | |
| | Polymerizing ratio | 40/60 | | 40/60 | 40/60 |
| | Molecular weight | 75,000 | | 75,000 | 75,000 |
| | Amount (parts) | 30 | — | 5 | 38 |
| (I) | n-BMA Polymer (*6) | | | | |
| | Molecular weight | | 220,000 | | |
| | Amount (parts) | — | 20 | — | — |
| (III) | THFMA Amount (parts) | 55 | 30 | 10 | — |
| (III) | 1,6-HD—DMA (*7) Amount (parts) | 15 | — | — | — |
| (III) | EG—DMA (*8) Amount (parts) | — | 10 | — | — |
| (III) | TMP—TMA (*9) Amount (parts) | — | 10 | — | — |
| (II) | PEG—EO—DMA | | | | |
| | EO added (moles) | | | 14 | |
| | Amount (parts) | — | — | 45 | — |
| (II) | PPG—PO—DMA | | | | |
| | PO added (moles) | | | 23 | |
| | Amount (parts) | — | — | 40 | — |
| | Solvent (*10) Amount (parts) | — | — | — | 62 |

(*6) n-Butyl methacrylate polymer
(*7) 1,6-Hexanediol dimethacrylate
(*8) Ethylene glycol dimethacrylate
(*9) Trimethylol propane trimethacrylate
(*10) Solvetz #100, produced by Esso Standard Oil KK

EXAMPLE 6

The pattern of FIG. 1 (17 cm×4 cm×10 μm) was printed on a single sheet of paper coated with dextrin solution with solvent-type decorating ink for decorating pottery which consisted of 60 wt% of pigment selenium red and 40 wt% binder (I) (40 parts of methyl methacrylate/n-butyl methacrylate copolymer and 60 parts of Sorvetz #100 described above) by use of a 250 mesh polyester screen plate.

This transfer paper was dried at 40° C., 50% RH for 1 hour to form a decorating ink layer. Then the ultraviolet curable type resin for cover coat (A') of the Preparation 2 was printed on the decorating ink layer in the size of 18 cm×4.5 cm×20 μm by use of a 100 mesh polyester screen plate. In this case, the screen was not clogged after more than 1,000 sheets of paper were printed. The printed cover coat layer was irradiated by a 5.6 KW water-cooled high pressure mercury lamp at the distance of 15 cm for 10 seconds.

The resulting printed transfer paper was transferred onto a coffee cup and a green tea cup of solid white by a wet process, and the mounting ability was evaluated. Then the above coffee cup and green tea cup were baked at the rate of 300° C./hour up to 800° C. and the baking and color developing properties were evaluated.

Further, in order to determine the blocking properties of the printed transfer paper, each printed surface and the back of the other paper were put together and 100 sheets of the transfer paper were tested under loading and the following conditions:

load: 17 g/cm$^2$, temperature: 25° C., humidity: 60% RH time: 24 hours.

The results for the mounting ability, blocking, baking and color developing properties of the ultraviolet curable resin (A') are shown in Table 7.

EXAMPLES 7-10

A print transfer paper for decorating pottery was prepared in the same manner as described in Example 6, except that the solvent type decorating ink for decorating pottery contains the pigment shown in Table 3 instead of selenium red of Example 6, and the ultraviolet curable type resins for cover coat (B')-(D') were used instead of (A').

The printing and mounting abilities, and baking and color developing properties of the cover coat layer are shown in the Table 7.

TABLE 7

| Example | 6 | 7 | 8 | 9 | 10 |
|---|---|---|---|---|---|
| Decorating ink pigment | Selenium red | Azure blue | Vanadium tin yellow | Zircon gray | Manganese pink |
| Ultraviolet curable type resin for cover coat | A' | B' | C' | D' | E' |
| Printing ability (number of sheets) | >1,000 | >1,000 | >1,000 | >1,000 | >1,000 |
| Mounting ability | o | o | o | o | o |
| Blocking property (number of sheets) | 0 | 0 | 0 | 0 | 0 |
| Baking and color developing properties | Good | Good | Good | Good | Good |

TABLE 7-continued

Reference example 5

The pattern was printed on a single sheet of paper of Example 6 coated with dextrin solution, with solvent-type decorating ink for decorating pottery (containing 60 wt% of selenium red as pigment and 40 wt% of binder (I)) in the same manner as described in Example 6.

Then, the ultraviolet curable type resin (F') of Reference preparation 2 was printed on the decorating ink layer in the size of 18 cm×4.5 cm×20 μm, by use of a 100 mesh polyester screen plate.

The test for curing of the printed cover coat layer and the printed transfer paper was carried out in the same manner as described in Example 6.

The results are shown in Table 8.

References 6 and 7

A printed transfer paper for decorating pottery was prepared in the same manner as described in Example 6, except that the decorating ink for decorating of pottery of the Example 6 contains the pigment shown in Table 8 instead of selenium red, and the ultraviolet curable type resins for cover coat (G') or (H') were used instead of (A').

The printing and mounting abilities, and baking and color developing properties of the cover coat layer are shown in the Table 8.

Reference example 8

The decorating ink layer was prepared in the same manner as described in Example 6, by use of a decorating ink containing zircon gray instead of a pigment of the solvent-type decorating ink for decorating pottery of Example 6.

The printing was performed in the same manner as described in Example 6, by using a solvent-type resin for cover coat (I') instead of the ultraviolet curable type resin for cover coat (A'), and the pattern layer was placed in a drier at 40° C., 50% RH for 1 hour to be dried. When this solvent-type resin for cover coat (I) was used, the screen was clogged after printing more than 20 sheets of paper. The test for a printed transfer paper was carried out in the same manner as described in Example 6, and the results are shown in Table 8.

TABLE 8

| Reference | 5 | 6 | 7 | 8 |
|---|---|---|---|---|
| Pigment | Selenium red | Azure blue | Vanadium tin yellow | Zircon gray |
| Resin for covering | F' | G' | H' | I' |
| Printing ability (number of sheets) | >1,000 | >1,000 | >1,000 | 20 |
| Mounting ability | Δ | Δ | x | o |
| Blocking property (number of sheets) | 0 | 0 | 0 | 30 |
| Baking and color developing abili- | Good | Few pinholes and blots | Good | Good |

TABLE 8-continued

| Reference | 5 | 6 | 7 | 8 |
|---|---|---|---|---|
| ties | | | | |

EXAMPLE 11

The pattern of FIG. 1 (17 cm×4 cm×10 cm) was printed on the paper coated with dextrin solution, with a ultraviolet curable type decorating ink for pottery which consists of 60 wt% of pigment, selenium red 60 and 40 wt% of the ultraviolet curable type resin for squeegee oil obtained in Preparation 1, by use of a 250 mesh, polyester screen plate. In this case, there were no clogging in the screen plate nor deficiency of fine lines after printing of over 1,000 sheets of paper.

The printed transfer paper was cured by irradiating under a 5.6 KW water-cooled high pressure mercury lamp at a distance of 15 cm for 14 seconds to form a decorating ink layer. Subsequently, the ultraviolet curable type resin for cover coat (A') was printed on the decorating ink layer obtained in Preparation 2 in the size of 18 cm×4.5 cm×20 μm by using a 100 mesh polyester screen plate. In this case, there was no clogging in the screen plate after printing over 1,000 sheets of paper. The printed cover coat layer was irradiated under a 5.6 KW water-cooled high pressure mercury lamp at a distance of 15 cm for 10 seconds to cure.

The resulting printed transfer paper was transferred onto a coffee cup and green tea cup of solid white by a wet method, and the mounting ability was evaluated. Then the above coffee cup and green tea cup were baked at a rate of 300° C./hr up to 800° C., and the baking and color developing properties were evaluated.

Further, in order to determine the blocking properties of the printed transfer paper, each printed surface and the back of the other paper were put together and 100 sheets of the transfer paper were tested under loading and the following condition:

Load: 17 g/cm, Temperature: 25° C., Humidity: 60% RH, Time: 24 hours.

The results, mounting ability, and blocking, baking and color developing properties, when the ultraviolet curable type decorating ink for decorating a pottery was used, are shown in Table 9.

TABLE 9

| Example | 11 |
|---|---|
| Decorating ink pigment | Selenium red |
| Ultraviolet curable type resin for squeegee oil | A |
| Ultraviolet curable type resin for cover coat | A' |
| Printing ability (number of sheets) | >1,000 |
| Mounting ability | o |
| Blocking property (number of sheets) | 0 |
| Baking and color developing properties | Good |

We claim:

1. A printed transfer paper for decorating pottery having a base paper, a decorating ink layer and a cover coat layer characterized in that a binder of the decorating ink layer and/or a cover coat agent of the cover coat layer comprises:

(a) 5 to 60% by weight of a polymer and/or copolymer (I) of a compound having a general formula (A):

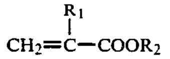
(A)

(wherein, $R_1$ is hydrogen or methyl; $R_2$ is hydrogen, or alkyl, cycloalkyl, aralkyl or aryl having 1 to 20 carbon atoms)

(b) 5 to 80% by weight of a photopolymerizable compound (III) having a general formula (B):

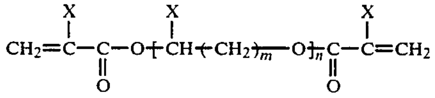
(B)

(wherein, X is hydrogen or methyl, m is a positive integer of 1 to 3, n represents moles of addition, $4 \geqq n \geqq 100$)

(c) 30 to 90% by weight of a photopolymerizable compound (III) having at least one polymerizable double bond in the molecule other than the compound having the general formula (B), and (d) a photoinitiator (IV).

2. A printed transfer paper for decorating pottery according to claim 1 characterized in that the binder of the decorating ink layer is an ultraviolet curable resin composition which comprises, based on the whole weight of the resin composition, from 5 to 60% by weight of polymer and/or copolymer (I) of compound having the general formula (A), from 5 to 80% by weight of photopolymerizable compound (II) having the general formula (B), from 30 to 90% by weight of photopolymerizable compound (III) having at least one double bond in the molecule other than the compound having the general formula (B), and based on the whole weight of (I), (II) and (III), 0.05 to 20% by weight of the photoinitiator (IV).

3. A printed transfer paper for decorating pottery according to claim 1 characterized in that the cover coat agent of the cover coat layer is an ultraviolet curable resin composition which comprises, based on the whole weight of the resin composition, from 10 to 60% by weight of polymer and/or copolymer (I) of compound having the general formula (A), from 5 to 80% by weight of photopolymerizable compound (II) having the general formula (B), from 30 to 90% by weight of photopolymerizable compound (III) having at least one double bond in the molecule other than the compound having the general formula (B), and based on the whole weight of (I), (II) and (III), 0.05 to 20% by weight of the photoinitiator (IV).

4. A printed transfer paper as recited in claim 1 wherein binder of the decorating ink layer and cover coat agent of the cover coat layer consist essentially of (I), (II), (III) and (IV).

5. A printed transfer paper as recited in claim 1 wherein binder of the decorating ink layer and cover coat agent of the cover coat layer are free of saturated copolyester and foaming agent.

* * * * *

UNITED STATES PATENT AND TRADEMARK OFFICE

CERTIFICATE OF CORRECTION

PATENT NO. : 4,666,756

DATED : May 19, 1987

INVENTOR(S) : KAZUHIKO SAKATA ET AL

It is certified that error appears in the above-identified patent and that said Letters Patent is hereby corrected as shown below:

Claim 1 (Column 16, line 24), "$4 \geq n \geq 100$)" should be --$4 \leq n \leq 100$)--

Signed and Sealed this

Eighteenth Day of August, 1987

*Attest:*

DONALD J. QUIGG

*Attesting Officer* *Commissioner of Patents and Trademarks*